(12) United States Patent
Weppner et al.

(10) Patent No.: US 8,658,317 B2
(45) Date of Patent: Feb. 25, 2014

(54) SOLID ION CONDUCTOR WHICH HAS A GARNET-LIKE CRYSTAL STRUCTURE AND HAS THE STOICHIOMETRIC COMPOSITION $L_{7+X}A_XG_{3-X}ZR_2O_{12}$

(75) Inventors: Werner Weppner, Heikendorf (DE); Ramaswamy Murugan, Puducherry (IN)

(73) Assignee: BASF SE (DE)

( * ) Notice: Subject to any disclaimer, the term of this patent is extended or adjusted under 35 U.S.C. 154(b) by 454 days.

(21) Appl. No.: 12/667,400

(22) PCT Filed: Jul. 2, 2008

(86) PCT No.: PCT/EP2008/005402
§ 371 (c)(1),
(2), (4) Date: Dec. 31, 2009

(87) PCT Pub. No.: WO2009/003695
PCT Pub. Date: Jan. 8, 2009

(65) Prior Publication Data
US 2010/0203383 A1    Aug. 12, 2010

(30) Foreign Application Priority Data

Jul. 2, 2007    (DE) .................... 10 2007 030 604

(51) Int. Cl.
*H01M 6/18*    (2006.01)

(52) U.S. Cl.
USPC . 429/321; 429/322; 423/594.12; 423/594.15; 423/593.1

(58) Field of Classification Search
USPC .......... 423/594.15, 519.16, 594.12, 608, 263; 429/322, 321; 252/519.15; 204/295
See application file for complete search history.

(56) References Cited

U.S. PATENT DOCUMENTS

| 7,901,658 B2 * | 3/2011 | Weppner et al. ......... 423/594.15 |
| 2007/0148553 A1 | 6/2007 | Weppner |
| 2009/0081554 A1 | 3/2009 | Takada et al. |
| 2009/0191458 A1 * | 7/2009 | Herle ............................ 429/207 |
| 2009/0311605 A1 * | 12/2009 | Visco et al. ............. 429/231.95 |
| 2010/0112444 A1 * | 5/2010 | Herle ............................ 429/221 |

FOREIGN PATENT DOCUMENTS

| CN | 1694285 A1 | 11/2008 | |
| EP | 2037527 A1 | 3/2009 | |
| WO | WO 2005/085138 | * 9/2005 | ............. C01G 33/00 |
| WO | WO-2005/085138 A1 | 9/2005 | |
| WO | WO-2007004590 A1 | 1/2007 | |

* cited by examiner

*Primary Examiner* — Raymond Alejandro
(74) *Attorney, Agent, or Firm* — Novak Druce Connolly Bove + Quigg LLP

(57) ABSTRACT

The invention is directed to a solid ion conductor which has a garnet-like crystal structure and has the stoichiometric composition $L_{7+x}A_xG_{3-x}Zr_2O_{12}$, wherein
L is in each case independently a monovalent cation,
A is in each case independently a divalent cation,
G is in each case independently a trivalent cation,
$0 \leq x \leq 3$ and
O can be partly or completely replaced by divalent or trivalent anion.

11 Claims, 9 Drawing Sheets

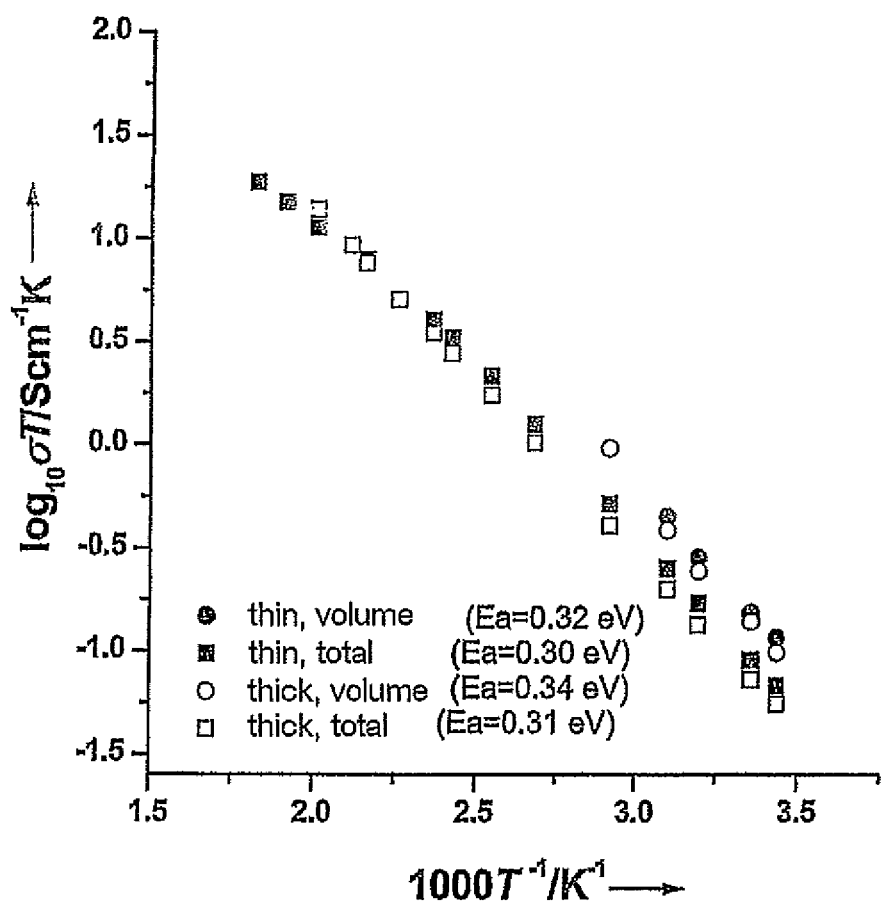

a)   b)   c)

Figure 1:
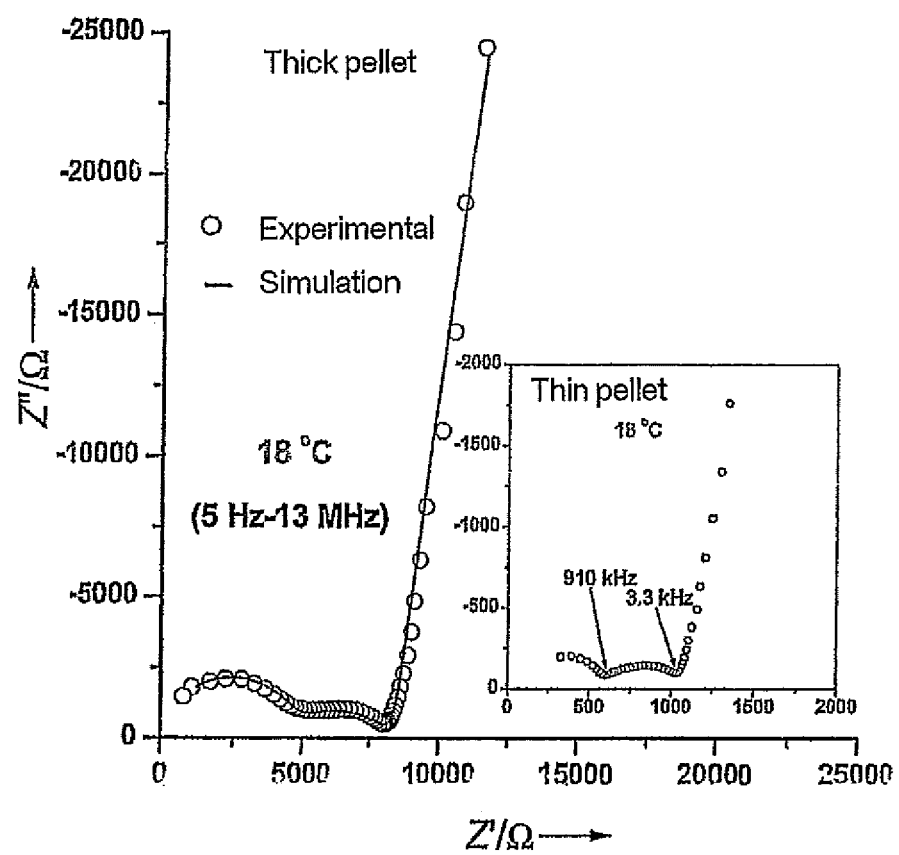

SOLID ION CONDUCTOR WHICH HAS A GARNET-LIKE CRYSTAL STRUCTURE AND HAS THE STOICHIOMETRIC COMPOSITION $L_{7+x}A_xG_{3-x}ZR_2O_{12}$

CROSS-REFERENCE TO RELATED APPLICATIONS

This application is a national stage application (under 35 U.S.C. §371) of PCT/EP2008/005402, filed Jul. 2, 2008, which claims benefit of German application 10 2007 030 604.2, filed Jul. 2, 2007.

BACKGROUND OF THE INVENTION

The present invention relates to the use of chemically stable solid ion conductors having a garnet-like structure in batteries, supercapacitors, accumulators and electrochromic devices, chemical sensors and thermoelectric converters, and also novel compounds which are suitable for these uses.

Rechargeable (secondary) batteries are used where grid-independent operation of electric and electronic appliances is necessary or desired for at least part of the time. Research on solid ion conductors as electrolyte materials for this use forms, in this context, an important aspect of current material research. The advantages sought in a battery composed only of solids are guaranteed freedom from leaks, miniaturizability, electrochemical stability, relatively high energy densities and a relatively long life.

Among the various battery technologies, battery systems based on lithium ions have become increasingly established in recent years. They are particularly notable for their high achievable electric energy density and power, which are attributable to the high chemical reactivity and the low mass of lithium ions and also their high mobility. The development of solid lithium ion conductors has attracted considerable attention in recent years. Examples are $Li_{2.9}PO_{3.3}N_{0.46}$ or $Li_3N$ and Li-β-aluminium oxide. However, $Li_{2.9}PO_{3.3}N_{0.46}$ has a significantly lower ion conductivity than liquid electrolytes. $Li_3N$ and Li-β-aluminium oxide are very sensitive to moisture. In addition, $Li_3N$ decomposes at a voltage as low as 0.445 V at room temperature and Li-β-aluminium oxide is not chemically stable.

Lithium ion conductors having a garnet-like structure were described for the first time in the study by Thangadurai et al., "Novel Fast Lithium Ion Conduction in Garnet-Type $Li_5La_3M_2O_{12}$ (M=Nb, Ta)", J. Am. Ceram. Soc. 86, 437-440, 2003. The garnet-like $Li_5La_3M_2O_{12}$ compounds have an appreciable lithium ion conductivity.

In structural terms, garnets are orthosilicates of the general composition $X_3Y_2(SiO_4)_3$ which crystallize in the cubic crystal system, where X and Y are octacoordinated and hexacoordinated cation sites. The individual $SiO_4$ tetrahedra are connected to one another by ionic bonds via the interstitial B cations.

The garnet-like compounds of the formula $Li_5La_3M_2O_{12}$ (M=Nb, Ta) which are described in the above-mentioned study by Thangadurai et al. contain an excess of Li ions compared to an ideal garnet structure. The $La^{3+}$ and $M^{5+}$ ions occupy the octacoordinated and hexacoordinated sites, while lithium ions occupy positions having six-fold coordination.

The PCT application WO 2005/085138 reports that further garnet-like lithium ion conductors are obtained formally by aliovalent substitution from the compounds of the formula $Li_5La_3M_2O_{12}$ (where M=Nb or Ta). Aliovalent substitution of the $La^{3+}$ sites can increase the connectivity of the network and enables the number of available vacancies to be varied. Charge balance is preferably achieved by means of $Li^+$ ions (L). For the purposes of the present invention, "aliovalent substitution" means the replacement of an ion by an ion having a different oxidation state, as a result of which cation vacancies, anion vacancies, interstitial cations and/or interstitial anions are formed. The solid lithium ion conductors are chemically stable and have an ion conductivity of more than $3.4 \times 10^{-5}$ S/cm. Owing to their high ion conductivity accompanied by negligible electron conductivity, they can be used as solid-state electrolytes.

The compounds described in WO 2005/085138 generally have the stoichiometric composition $L_{5+x}A_yG_zM_2O_{12}$, where L is in each case independently any preferred monovalent cation, A is in each case independently a monovalent, divalent, trivalent or tetravalent cation, G is in each case independently a monovalent, divalent, trivalent or tetravalent cation, M is in each case independently a trivalent, tetravalent or pentavalent cation, $0 \leq x \leq 3$, $0 \leq y \leq 3$, $0 \leq z \leq 3$ and O can be partly or completely replaced by divalent and/or trivalent anions such as $N^{3-}$.

In the ion conductors described M is in each case one of the metals Nb and Ta. Other examples of metal ions are not given. Ion conduction occurs via lithium ions (L=Li).

Further examples of lithium ion conductors having a garnet structure have been examined in recent years (V. Thangadurai, W. Weppner, Adv. Funct. Mater. 2005, 15, 107-112; V. Thangadurai, W. Weppner, J. Power Sources, 2005, 142, 339-344). Here, $Li_6BaLa_2Ta_2O_{12}$ had the highest $Li^+$ ion conductivity of $4 \times 10^{-5}$ Scm$^{-1}$ at 22° C. with an activation energy of 0.40 eV. While $Li_6BaLa_2Ta_2O_{12}$ is stable towards reaction with metallic lithium, moisture, air and customary electrode materials, the volume conductivity and total conductivity at room temperature are still not sufficiently high to enable an ideal rechargeable solid lithium ion battery to be developed.

Another problem associated with the above ion conductors of the prior art is that the proposed metals niobium and tantalum are relatively expensive and not readily available. In addition, the use of a solid electrolyte which consists entirely of the garnet-like compounds described is complicated and associated with high costs.

BRIEF SUMMARY OF THE INVENTION

It was therefore an object of the present invention to provide improved solid ion conductors in which the above disadvantages are at least partly overcome.

It has now been found, according to the invention, that zirconium can be used as metal M in the garnet-like ion conductors. In contrast to niobium and tantalum, zirconium is readily available and leads to very stable solid-state structures. While Nb and Ta are formally present in the oxidation state +V in the garnet structure, Zr is preferably in the oxidation state +IV.

The invention therefore provides, in one embodiment, a solid ion conductor which has a garnet-like crystal structure and has the stoichiometric composition $L_{7+x}A_xG_{3-x}Zr_2O_{12}$, where L is in each case independently a monovalent cation, A is in each case independently a divalent cation, G is in each case independently a trivalent cation, $0 \leq x \leq 3$ and O can be partly or completely replaced by divalent or trivalent anions such as $N^{3-}$.

L is particularly preferably an alkali metal ion, for example $Li^+$, $Na^+$ or $K^+$. In particular, combinations of various alkali metal ions are also possible for L. In a particularly preferred embodiment of the invention, $L=Na^+$. Sodium is very inexpensive and available in any amounts. The small $Na^+$ ion can move readily in the garnet-like structures and in combination with zirconium gives chemically stable crystal structures.

A is any divalent cation or any combination of such cations. Divalent metal cations can preferably be used for A. Particular preference is given to alkaline earth metal ions such as Ca, Sr, Ba and/or Mg and also divalent transition metal cations such as Zn. It has been found that these ions move very little if at all in the garnet-like compounds according to the invention, so that ion conduction occurs essentially via L.

In the above composition, preference is also given to $0 \leq x \leq 2$ and particularly preferably $0 \leq x \leq 1$. In an embodiment according to the invention, $x=0$, so that A is not present in the garnet-like compound.

G is any trivalent cation or any combination of such cations. Trivalent metal cations can preferably be used for G. Particular preference is given to $G=La$.

In a structure of the above composition, $O^{2-}$ can be partly or completely replaced by other anions. For example, it is advantageous to replace $O^{2-}$ completely or partly by other divalent anions. Furthermore, $O^{2-}$ can also be aliovalently replaced by trivalent anions with appropriate charge compensation.

In a further aspect; the present invention provides a solid ion conductor of the stoichiometric composition. $L_{7+x}A_xLa_{3-x}Zr_2O_{12}$, where A is a divalent metal and L is Li or Na. Because of its ready availability, Na is particularly preferred. In a preferred embodiment, $x=0$, so that the composition is $L_7La_3Zr_2O_{12}$.

A is preferably selected from among alkaline earth metals, preferably from among Ca, Sr, Ba and/or Mg. Preference is likewise given to A being selected from among divalent transition metals, for example $A=Zn$. Greatest preference is given to $A=Sr$ or Ba.

Ion conductors of the composition $L_{7+x}A_xLa_{3-x}Zr_2O_{12}$ have a garnet-like crystal structure. Compared to the known compounds of the composition $L_5La_3Nb_2O_{12}$ (L=Li), the two Nb(+V) cations have formally been replaced by two Zr(+IV) cations and two monovalent L cations. In addition, La(+III) may have been replaced by A(+II) and L(+I). In this way, the total proportion of L in the structure has been increased. L is preferably Li or Na, via which the ion conduction of the compounds having a garnet structure occurs. As a result, the compounds of the present invention make it possible to provide significantly improved ion conductors.

Compared to the compounds of the prior art, the materials of the composition $L_{7+x}A_xLa_{3-x}Zr_2O_{12}$ display an increased ion conductivity. Owing to the garnet structure of the compounds of the present invention, which is a 3D-isotropic structure, ion conduction in three dimensions without a preferential direction is possible.

The electronic conductivity of the compounds of the present invention is, on the other hand, comparatively low. The polycrystalline samples of the compounds of the present invention also have a low grain boundary resistance, so that the total conductivity is made up virtually exclusively of the volume conductivity.

A further advantage of the materials is their high chemical stability. The materials display, in particular, no discernible changes on heating in contact with molten lithium. At temperatures up to 350° C. and DC voltages up to 6 V, no chemical decomposition is observed.

An example of a particularly preferred compound according to the invention having a garnet structure is $Li_7La_3Zr_2O_{12}$. The high lithium ion conductivity, good thermal and chemical stability in respect of reactions with possible electrodes, environmental compatibility, availability of the starting materials, low manufacturing costs and simple production and sealing make $Li_7La_3Zr_2O_{12}$ a promising solid electrolyte which is particularly suitable for rechargeable lithium ion batteries.

According to a further aspect, the present invention provides a process for preparing the solid ion conductors having a garnet-like structure. The compounds can be formed by reaction of appropriate salts and/or oxides of the elements present, for example by means of a solid-state reaction. Particularly useful starting materials are nitrates, carbonates and hydroxides which are converted into the corresponding oxides during the course of the reaction.

The present invention more specifically relates to a process for preparing the solid ion conductors of the composition $L_{7+x}A_xG_{3-x}Zr_2O_{12}$ (e.g. $Na_6ALa_2Zr_2O_{22}$). The materials can be obtained by reaction of appropriate salts and/or oxides of A, G and Zr with a hydroxide, nitrate or carbonate of L in a solid-state reaction. A is as defined above. The divalent metal A is preferably used in the form of nitrates. Here, preference is given to $Ca(NO_3)_2$, $Sr(NO_3)_2$ and $Ba(NO_3)_2$. In the case of G, preference is given to using La which is preferably employed in the form of $La_2O_3$. Zr is advantageously used as oxide, preferably $ZrO_2$. L is preferably used in the form of LOH, $LNO_3$ or $L_2CO_3$. For example, $LiOH.H_2O$ or $NaOH.H_2O$ can preferably be used. To compensate for a weight loss of L (e.g. L=Li, Na) during the heat treatment of the samples, the respective salt is preferably used in excess, for example an excess of 10% by weight.

The starting materials are mixed in a first step and can, for example, be milled in 2-propanol in a ball mill using zirconium oxide milling media. The mixture obtained in this way is subsequently heated at temperatures in the range of preferably 400-1000° C. in air for a number of hours, preferably 2-10 hours. Temperatures of 600-800° C., for example about 700° C., and a heat treatment time of 4-8 hours e.g. about 6 hours, are particularly suitable. Milling is then carried out again, preferably likewise in 2-propanol in a ball mill using zirconium oxide milling media. The reaction product is subsequently pressed uniaxially or preferably isostatically to give moulded pieces, for example pellets. These are then sintered for a number of hours, preferably 10-50 hours, more preferably 20-30 hours, at temperatures in the range of preferably 700-1200° C., more preferably 800-1000° C. Temperatures of about 900° C. and a heat treatment time of about 24 hours are particularly suitable here. During this sintering process, it is advantageous to cover the samples with a powder of the same composition in order to avoid excessive losses of the L oxide.

Possible methods which can easily be employed for preparing the compound are precursor methods, e.g. the Pecchini method, the glycine method or precipitation reactions, since soluble salts exist for all components.

The solid ion conductors of the invention (e.g. lithium or sodium ion conductors) are, as solid-state electrolytes, a valuable starting material. Since the materials have an extraordinarily high ion conductivity accompanied by negligible electron conduction, they can be used as solid electrolyte for batteries (e.g. lithium or sodium batteries) having a very high energy density. The high stability of the materials in respect of chemical reactions, e.g. with elemental lithium and customary electrode materials, leads to, for example, the solid ion conductors of the present invention being able to be put to practical use in batteries.

The resistance of the phase boundary between the solid electrolytes of the present invention and the electrodes is also very small compared to customary solid electrolyte materials. As a result, batteries having a comparatively high power (high currents) can be produced using the materials according to the invention. The use of the solid-state electrolytes of the present invention also results in improved safety compared to the use of liquid electrolytes. This is of particular advantage when the electrolytes are used in motor vehicles.

In a further aspect, the present invention provides for, apart from the use in batteries, the use of the solid ion conductors (e.g. lithium ion conductors) in electrochromic systems (windows, VDUs, exterior walls, etc.) and for instantaneous energy storage and release in supercapacitors (supercaps). When the ion conductors of the invention are used, it is possible to achieve energy densities of capacitors of 100 F/cm$^3$ or more. A further aspect of the invention is the use of the garnet-like solid ion conductors as sensors, in particular for numerous gases. According to the invention, it is also possible to use the material in thermoelectric converters for efficient direct conversion of heat into electric energy.

The ion conductors having garnet-like structures can also be used as buffer layers in combination with other electrolytes, for example conventional aprotic liquid electrolytes. It is therefore not necessary to use an electrolyte which consists entirely of the garnet-like structure. Rather, it is possible to use any known electrolytes which can, for example, be present in liquid, gel or solid form in combination with the novel garnet-like ion conductors.

The invention therefore provides, in a further aspect, for the use of a solid ion conductor having a garnet-like crystal structure as protective layer before an electrode so as to improve the chemical stability towards the electrolyte. For this purpose, it is possible to use not only the garnet-like structures according to the invention containing zirconium but also, for example, the garnet-like compounds described in WO 2005/085138. The use of the ion conductors as buffer structure before the electrodes prevents short circuits and makes it possible to generate and apply relatively high voltages so as to achieve a significantly greater energy density and life.

A BRIEF DESCRIPTION OF THE FIGURES

FIG. 1:
AC impedance curve of $Li_1La_3Zr_2O_{12}$, measured at 18° C. in air on a thick pellet (1.02 cm thick and 0.92 cm in diameter). The continuous line represents the simulated data for an equivalent current circuit comprising $(R_bQ_b)$ $(R_{gb}Q_{gb})$ $(Q_{el})$ (where R is the resistance and Q is the constant phase element and the indices g, gb and el indicate grain volume, grain boundary and electrode) using the EQUIVALENT Program (B. A. Boukamp, Equivalent Circuit, Version 4.55, 1997, Faculty of Chemical Technology, University of Twente, 7500 AE Enschede (The Netherlands), Report No. CT88/265/128/ CT89/214/128; May 1989). The impedance curve measured at 18° C. in air on a thin pellet (0.18 cm thick and 0.98 cm in diameter) of $Li_7La_3Zr_2O_{12}$ is shown in the inset.

FIG. 2:
a) Arrhenius curves for the electrical volume and total conductivity (volume and grain boundaries) of the thick pellets of $Li_7La_3Zr_2O_{12}$, obtained in two successive heating and cooling cycles.
b) Comparison of the Arrhenius curves obtained for the thick and thin pellets of $Li_7La_3Zr_2O_{12}$ during the first heating run (18-300° C.).

Figure 3:
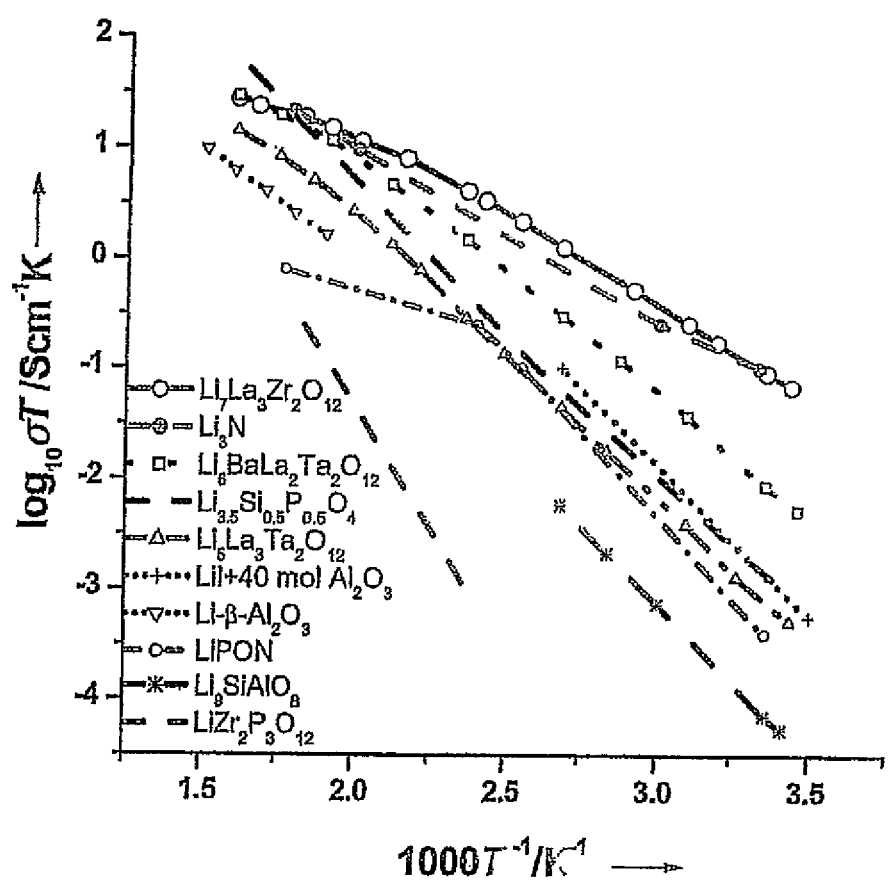

FIG. 3:
Comparison of the total conductivity (volume+grain boundaries) of $Li_7La_3Zr_2O_{12}$ and other known lithium ion conductors which come into question for battery applications.

Figure 4:
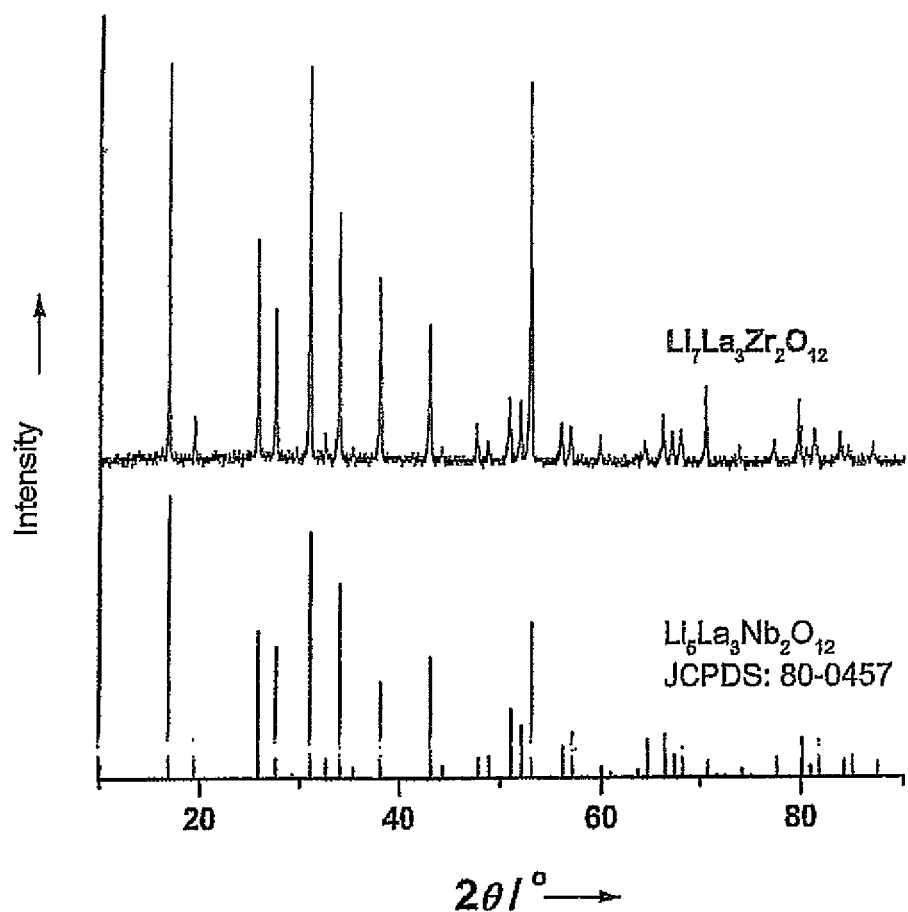

FIG. 4:
Measured powder XRD pattern of $Li_7La_3Zr_2O_{12}$ and standard pattern of the known garnet phase $Li_5La_3Nb_2O_{12}$ (JCPDS: 80-0457) as per Joint Committee on Powder Diffraction Standards.

Figure 5:
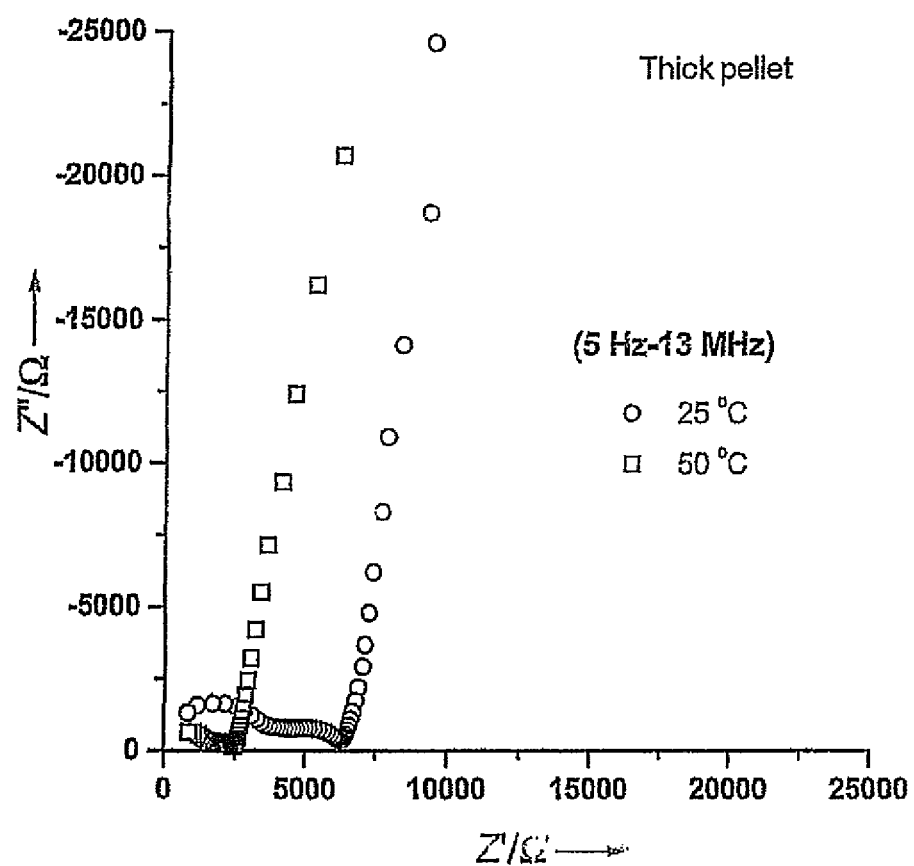

FIG. 5:
AC impedance curves measured at 25 and 50° C. in air on the thick pellet of $Li_7La_3Zr_2O_{12}$.

Figure 6:
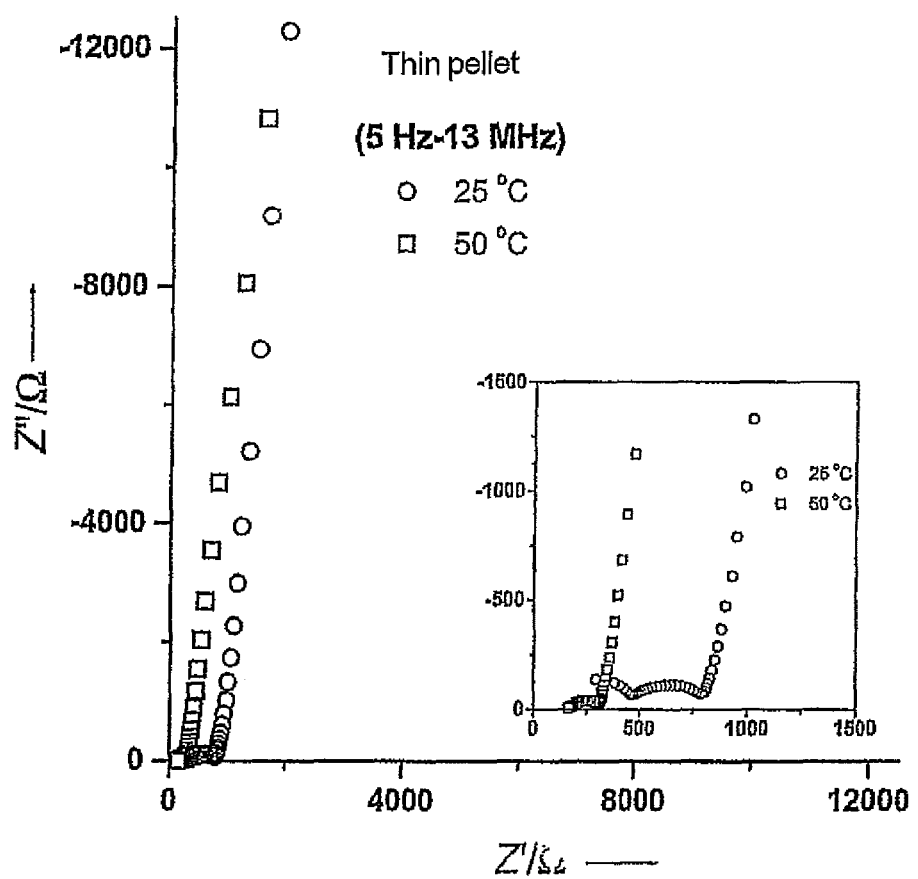

FIG. 6:
AC impedance curves measured at 25 and 50° C. in air on the thin pellet of $Li_7La_3Zr_2O_{12}$. The further curve at higher frequency is shown as an inset.

Figure 7:
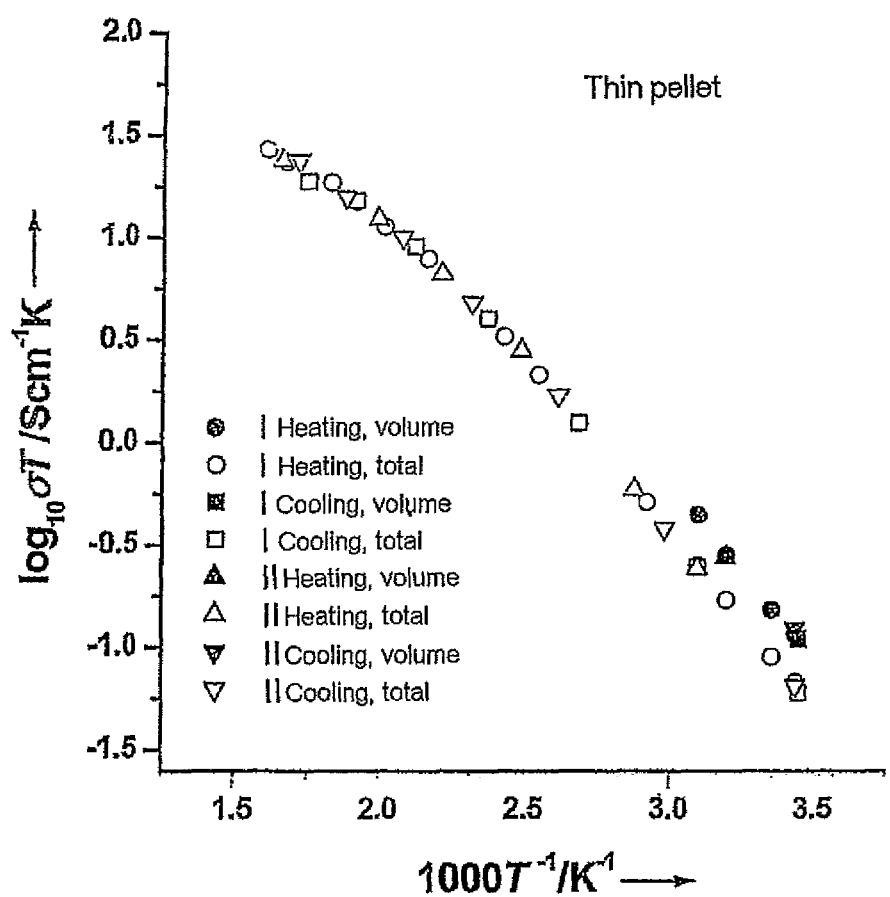

FIG. 7:
Arrhenius curves for the electrical volume and total (volume+grain boundary) conductivity of the thin pellet of $Li_7La_3ZrO_{12}$, obtained in two successive heating and cooling cycles.

Figure 8:
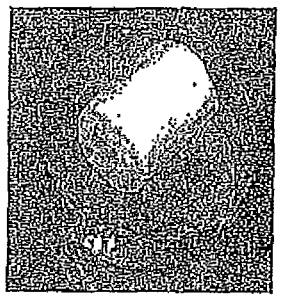
Figure 8:
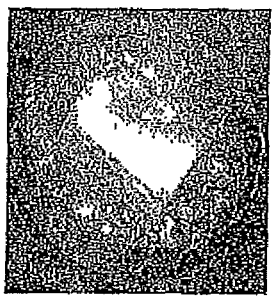
Figure 8:
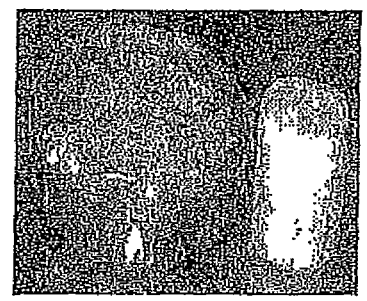

FIG. 8:
Photographs of a) $Li_7La_3Zr_2O_{12}$ pellet and molybdenum crucible before exposure to molten lithium, b) $Li_7La_3Zr_2O_{12}$ pellet in molten lithium and c) $Li_7La_3Zr_2O_{12}$ pellet and molybdenum crucible immediately after exposure to molten lithium for 48 hours. The photograph depicted in Figure c) shows that the colour of the pellet remains unchanged (ivory colour) and no reaction product is formed.

DETAILED DESCRIPTION OF THE INVENTION

The following example serves to illustrate a particularly preferred embodiment of the present invention.

Example

Stoichiometric amounts of the in each case highly pure starting materials:
LiOH (Alfa Aesar, >99%), predried at 200° C. for 6 h, 10% by weight excess in order to compensate for the Li loss during the sintering process;
$La_2O_3$ (Alfa Aesar, >99.99%), predried at 900° C. for 24 h; and
$ZrO_2$ (Aldrich, >99%)
were reacted in a solid-state reaction.

The starting materials were ball-milled for about 12 hours in 2-propanol using zirconium oxide containers and balls. This was followed by heat treatment at 900 and 1125° C. in air for 12 hours. The product obtained was then once again ball-milled. The reaction products were subsequently isostatically pressed to form pellets and sintered at 1230° C. for 36 h. The samples were covered with a powder having the same composition during this procedure in order to avoid an excessive loss of lithium. The heating rate in all treatments was 1° C. per minute. The sintered compressed pellets were cut into thinner pellets by means of a diamond saw. Phase formation was monitored using X-ray powder diffraction (XRD) (SEIFERT 3000, CuK$_\alpha$, Germany). The lattice constants were determined from the powder XRD data using the method of least squares.

The measurement of the electrical conductivity was carried out in air using two pellets of differing thickness (thick pellet: 1.02 cm thick and 0.92 cm in diameter, and thin pellet: 0.18 cm thick and 0.98 cm in diameter). The measurement was carried out using Li-ion-blocking Au electrodes (Au paste cured at 700° C. for 1 h) in the temperature range from 18 to 350° C. by means of an impedance and gain phase analyzer (HP 4192A, Hewlett-Packard Co., Palo Alto, Calif.) (5 Hz-13 MHz). Before each impedance measurement, the samples were equilibrated at constant temperature for from 3 to 6 hours. The impedance measurements were carried out in two successive heating and cooling cycles for each pellet. The data for the thermogravimetric analysis (TGA) and differential thermal analysis (NETZSCH STA 409 C/CD) were measured in air over the temperature range 20-900-20° C. at a heating and cooling rate of 2° C. per minute and isothermally at 900° C.

The stability of $Li_7La_3Zr_2O_{12}$ towards molten lithium was examined in an argon-filled glove box by reacting the pellet with a large excess of molten lithium in a molybdenum crucible for 48 hours.

Although numerous X-ray diffraction (XRD) studies have been carried out on $Li_5La_3M_2O_{12}$ (M=Nb, Ta) garnets, there has been controversy about the structure in respect of the space group and position of the lithium cations (a) D. Mazza, Mater. Lett. 1988, 7, 205-207; b) H. Hyooma, K. Hayashi, Mater. Res. Bull. 1988, 23, 1399-1407; C) J. Isasi, M. L. Veiga, R. Saez-Puche, A. Jereze, C. Pico, J. Alloys Compd. 1991, 177, 251-257). Recently, neutron diffraction studies have indicated that $Li_5La_3M_2O_{12}$ (M=Nb, Ta) crystallizes in the space group Ia3d and that Li is located both in the tetrahedral positions and octahedral positions and that vacancies are present in both types of positions (a) E. J. Cussen, Chem. Commun. 2006, 412-413; b) M. P. O'Callaghan, D. R. Lynham, E. J. Cussen, G. Z. Chen, Chem. Mater. 2006, 18, 4681-4689). The measured powder XRD pattern of $Li_7La_3Zr_2O_{12}$ agrees well with the standard pattern of the known garnet phase $Li_5La_3Mb_2O_{12}$ and demonstrates the ability of the garnet structure to incorporate cations of differing oxidation state and different size without an excessive change in the symmetry. The diffraction pattern for a cubic cell having a lattice constant of A=12.9682 (6) Å was determined.

A typical impedance curve obtained at 18° C. for a thick pellet of $Li_7La_3Zr_2O_{12}$ is shown in FIG. 1. The occurrence of the rise in the region of low frequencies when the electrodes are ionically blocked is an indication that the material examined is an ion conductor (a) V. Thangadurai, R. A. Huggins, W. Weppner, J. Power Sources 2002, 108, 64-69; b) J. T. S. Irvine, D. C. Sinclair, A. R. West, Adv. Mater. 1990, 2, 132-138). Similar behaviour has been observed for the previously studied materials having a garnet-like structure. The impedance curve could be resolved into volume, grain boundary and electrode resistances. The continuous line in FIG. 1 represents the data for an equivalent current circuit of $(R_bQ_b)$ $(R_{gb}Q_{gb})$ $(Q_{el})$ using the EQUIVALENT Program. The impedance curve for the thin pellet of $Li_7La_3Zr_2O_{12}$ measured at 18° C. is shown as an inset in FIG. 1. The volume and total conductivity of the thick pellet (1.02 cm thick and 0.92 cm in diameter) and the thin pellet (0.18 cm thick and 0.98 cm in diameter) of $Li_7La_3Zr_2O_{12}$ observed at various temperatures were obtained from the intersections of the high-frequency and, low-frequency semicircles with the axis and are summarized in Table 1. The data shown in FIG. 1 and Table 1 indicate similar electrical properties for the thick and thin pellets of $Li_7La_3Zr_2O_{12}$. The thin pellet displays a slightly higher volume and total conductivity compared to the thick pellet. In addition, it is interesting to note that the grain boundary contribution to the total resistance is less than 50% and decreases with increasing temperature (Table 1) both for the thick pellet and for the thin pellet. At higher temperature (above 75° C. for the thick pellet and above 50° C. for the thin pellet), it is difficult to determine the grain boundary contribution compared to the volume contribution precisely; the total value of the volume and grain boundary contributions has therefore been shown for the determination of the electrical conductivity over the temperature range examined. The total conductivity at room temperature ($3 \times 10^{-4}$ S/cm at 25° C.) of the novel crystalline fast lithium ion conductor $Li_7La_3Zr_2O_{12}$ having a garnet-like structure is better than that of all other solid lithium ion conductors and all previously described lithium garnets.

This result, viz. that total and volume conductivities are of the same order of magnitude, is a particularly advantageous property of the $Li_7La_3Zr_2O_{12}$ garnet structure examined here compared to other ceramic lithium ion conductors. For many applications of solid electrolytes in electrochemical devices such as batteries, sensors and electrochromic displays, the total conductivity should be as high as possible. In addition, volume and total conductivity can be improved further by means of a low-temperature synthesis of $Li_7La_3Zr_2O_{12}$ and by means of further densification using a suitable sintering process.

Figure 2A:
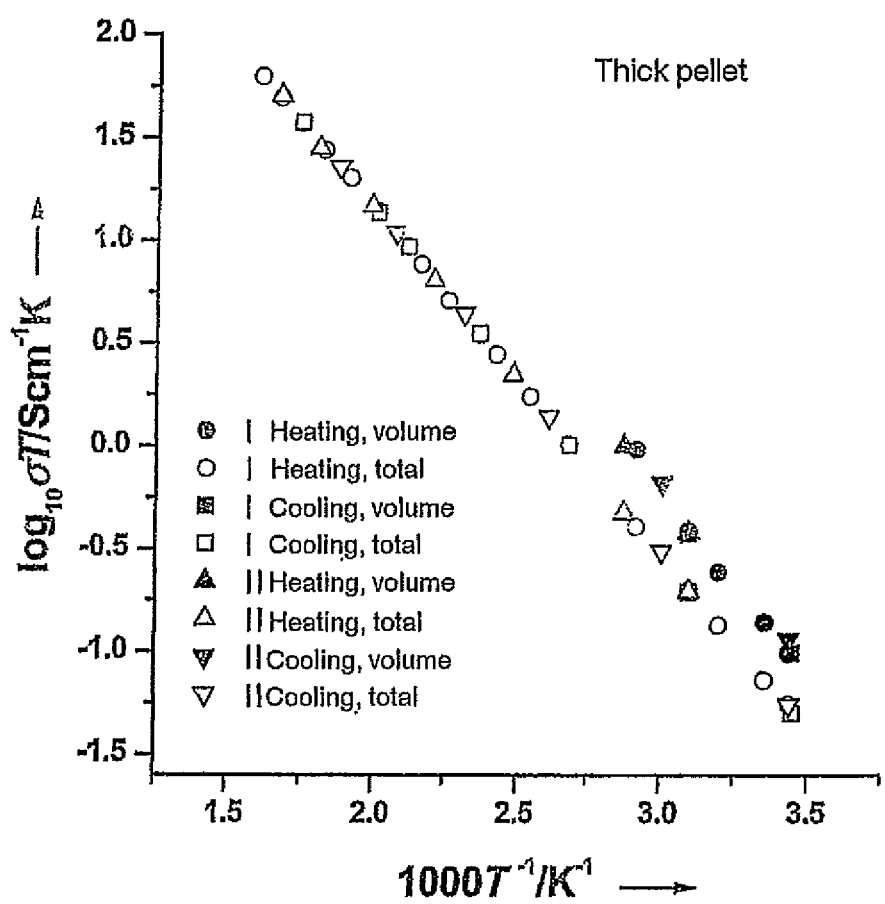

The Arrhenius curves for the electrical volume and total conductivity of $Li_7La_3Zr_2O_{12}$, obtained in two heating and cooling cycles, are shown for the thick pellet in FIG. 2a. There is no appreciable change in the conductivity between the two cycles. This means that the garnet-like structure examined is thermally stable and that no phase transition occurs in the temperature range examined, viz. from room temperature to 350° C. A similar Arrhenius behaviour was also observed for the thin pellet of $Li_7La_3Zr_2O_{12}$. In FIG. 2b, the data for the thick pellet and the thin pellet of $Li_7La_3Zr_2O_{12}$, which were in each case obtained in the first heating run, are compared. The activation energies obtained for the volume and total conductivity of the thin pellet (0.32 eV at 18-50° C. and 0.30 eV at 18-300° C.) are slightly lower than those for the volume and total conductivity of the thick pellet (0.34 eV at 18-70° C. and 0.31 eV at 18-300° C.). The conductivity obtained for the thin pellet is slightly higher than that of the thick pellet.

In addition to the impedance analysis, the ionic nature of the electrical conductivity was also confirmed by EMF measurements in which $Li_7La_3Zr_2O_{12}$ was used as solid electrolyte between elemental lithium and Al, LiAl. The sample was covered with an aluminium layer on the upper side and placed on lithium which had been melted in a glove box filled with inert Ar gas. The aluminium was alloyed both by chemical reaction with lithium and also by coulometric titration of lithium into the aluminium from the lithium electrode located opposite it. The resulting voltage was in the region of the theoretical value. The difference could be attributed to the inhomogeneous temperature distribution and corresponding phenomena due to irreversible processes.

FIG. 3 shows a comparison of the lithium ion conductivity of $Li_7La_3Zr_2O_{12}$ with other known lithium ion conductors which are under consideration for use in connection with batteries. The conductivity is higher than that of Li-β-aluminium oxide, thin-layer Lipon ($Li_{2.9}PO_{3.3}N_{0.46}$), $Li_9SiAlO_8$, $LiI+40$ mol $Al_2O_3$, $LiZr_2(PO_4)_3$, $Li_{3.5}Si_{0.5}P_{0.5}O_4$, $Li_5La_3Ta_2O_{12}$ and $Li_6BaLa_2Ta_2O_{12}$. The high lithium conductivity compared to other lithium-containing garnets and low activation energy which are observed are possibly due to the increase in the cubic lattice constants, the increase in the lithium ion concentration, a reduced chemical interaction between the lithium ions and other ions which form the lattice and partly to the improved densification (92% of the theoretical density). At relatively low temperatures, the conductivity of the less stable polycrystalline $Li_3N$ ($6.6 \times 10^{-4}$ S/cm at 27° C.) is comparable with that of $Li_7La_3Zr_2O_{12}$. However, at higher temperature, $Li_7La_3Zr_2O_{12}$ displays a higher total conductivity.

The thermal stability of $Li_7La_3Zr_2O_{12}$, which is the fundamental advantage of the crystalline lithium ion conductor, was confirmed by thermogravimetric measurements (TGA) and differential thermal analysis (DTA). The TG-DTA data measured in an air atmosphere indicated no significant change in the mass and no discernible phase change both during heating and during cooling within the temperature range from 20 to 900° C. It was found that zirconium-containing $Li_7La_3Zr_2O_{12}$ is stable towards molten lithium and is also chemically stable to the action of moisture and air over the observation period of several weeks.

TABLE 1

Impedance data for $Li_7La_3Zr_2O_{12}$ (thick pellet: 1.02 cm thick and 0.92 cm in diameter, and thin pellet: 0.18 cm thick and 0.98 cm in diameter), measured in air.

| Type of pellets | Temperature (° C.) | $\sigma_{volume}$ (Scm$^{-1}$) | $\sigma_{total}$ (Scm$^{-1}$) | $R_{gb}/R_b + R_{gb}$[a] |
|---|---|---|---|---|
| Thick pellet | 18 | 3.37 × 10$^{-4}$ | 1.90 × 10$^{-4}$ | 0.44 |
|  | 25 | 4.67 × 10$^{-4}$ | 2.44 × 10$^{-4}$ | 0.48 |
|  | 50 | 1.19 × 10$^{-3}$ | 6.15 × 10$^{-4}$ | 0.49 |
| Thin pellet | 18 | 3.97 × 10$^{-4}$ | 2.32 × 10$^{-4}$ | 0.42 |
|  | 25 | 5.11 × 10$^{-4}$ | 3.01 × 10$^{-4}$ | 0.41 |
|  | 50 | 1.45 × 10$^{-3}$ | 7.74 × 10$^{-4}$ | 0.47 |

[a]$R_{gb}$ = grain boundary resistance, $R_b$ = volume resistance

TABLE 2

Powder XRD pattern of $Li_7La_3Zr_2O_{12}$ having a garnet structure

| h | k | l | $d_{obs.}$ (Å) | $d_{cal.}$ (Å) | $I_{obs}$ |
|---|---|---|---|---|---|
| 2 | 1 | 1 | 5.278 | 5.294 | 99 |
| 2 | 2 | 0 | 4.574 | 4.584 | 17 |
| 3 | 2 | 1 | 3.460 | 3.465 | 55 |
| 4 | 0 | 0 | 3.239 | 3.242 | 42 |
| 4 | 2 | 0 | 2.897 | 2.899 | 100 |
| 3 | 3 | 2 | 2.761 | 2.764 | 14 |
| 4 | 2 | 2 | 2.645 | 2.647 | 61 |
| 5 | 2 | 1 | 2.365 | 2.367 | 49 |
| 5 | 3 | 2 | 2.102 | 2.103 | 37 |
| 6 | 2 | 0 | 2.048 | 2.050 | 11 |
| 6 | 3 | 1 | 1.911 | 1.912 | 16 |
| 4 | 4 | 4 | 1.870 | 1.871 | 12 |
| 6 | 4 | 0 | 1.798 | 1.798 | 21 |
| 6 | 3 | 3 | 1.764 | 1.764 | 20 |
| 6 | 4 | 2 | 1.732 | 1.732 | 93 |
| 7 | 3 | 2 | 1.646 | 1.646 | 15 |
| 8 | 0 | 0 | 1.620 | 1.621 | 14 |
| 6 | 5 | 3 | 1.549 | 1.550 | 13 |
| 7 | 5 | 2 | 1.468 | 1.468 | 9 |
| 8 | 4 | 0 | 1.450 | 1.449 | 11 |
| 8 | 4 | 2 | 1.415 | 1.414 | 17 |

TABLE 2-continued

Powder XRD pattern of $Li_7La_3Zr_2O_{12}$ having a garnet structure

| h | k | l | $d_{obs.}$ (Å) | $d_{cal.}$ (Å) | $I_{obs}$ |
|---|---|---|---|---|---|
| 9 | 2 | 1 | 1.398 | 1.398 | 14 |
| 6 | 6 | 4 | 1.382 | 1.382 | 14 |
| 9 | 3 | 2 | 1.337 | 1.337 | 24 |
| 7 | 7 | 2 | 1.283 | 1.284 | 10 |
| 7 | 6 | 5 | 1.236 | 1.236 | 11 |
| 8 | 6 | 4 | 1.204 | 1.204 | 21 |
| 10 | 4 | 2 | 1.184 | 1.183 | 14 |
| 10 | 5 | 1 | 1.155 | 1.155 | 13 |
| 8 | 8 | 0 | 1.146 | 1.146 | 10 |
| 10 | 5 | 3 | 1.120 | 1.120 | 10 |

The invention claimed is:

1. A solid ion conductor which has a garnet-like crystal structure and has the stoichiometric composition $L_{7+x}A_xG_{3-x}Zr_2O_{12}$, where
   L is in each case independently a monovalent cation,
   A is in each case independently a divalent cation,
   G is in each case independently a trivalent cation,
   $0 \leq x \leq 3$ and
   O can be partly or completely replaced by divalent or trivalent anion, wherein the ion conductivity is greater than $4 \times 10^{-5}$ Scm$^{-1}$ at 22° C.

2. The solid ion conductor according to claim 1, wherein $0 \leq x \leq 1$ and O can be partly or completely replaced by divalent anion or $N^{3-}$.

3. The solid ion conductor according to claim 1, wherein L is in each case independently is Li, Na or K.

4. The solid ion conductor according to claim 3, wherein L=Na.

5. The solid ion conductor according to claim 1, wherein A is a divalent alkaline earth metal cation.

6. The solid ion conductor according to claim 1, wherein A is Ca, Sr and/or Ba.

7. The solid ion conductor according to claim 1, wherein the stoichiometric composition is $Li_7La_3Zr_2O_{12}$.

8. An electrode which has been coated with the solid ion conductor as claimed in claim 1.

9. A battery comprising one or more electrodes according to claim 8.

10. The electrode according to claim 8, wherein the garnet-like crystal structure has the stoichiometric composition $L_{7+x}A_xG_{3-x}Zr_2O_{12}$, where
    L is in each case independently a monovalent cation,
    A is in each case independently a divalent cation,
    G is in each case independently a trivalent cation,
    $0 \leq x \leq 3$ and
    O can be partly or completely replaced by divalent or trivalent anion.

11. A battery comprising one or more electrodes according to claim 10.

* * * * *